(12) United States Patent
Donderici et al.

(10) Patent No.: US 11,243,325 B2
(45) Date of Patent: Feb. 8, 2022

(54) PROCESSING RESISTIVITY IMAGES IN WELLS WITH OIL BASED MUDS

(71) Applicant: Halliburton Energy Services, Inc., Houston, TX (US)

(72) Inventors: Burkay Donderici, Pittsford, NY (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 89 days.

(21) Appl. No.: 16/587,515

(22) Filed: Sep. 30, 2019

(65) Prior Publication Data

US 2020/0041683 A1 Feb. 6, 2020

Related U.S. Application Data

(63) Continuation of application No. PCT/US2017/059185, filed on Oct. 31, 2017.

(51) Int. Cl.
*G01V 3/24* (2006.01)
*G01V 3/38* (2006.01)
(Continued)

(52) U.S. Cl.
CPC .............. *G01V 3/24* (2013.01); *E21B 47/002* (2020.05); *E21B 49/00* (2013.01); *G01V 3/38* (2013.01); *E21B 47/12* (2013.01)

(58) Field of Classification Search
CPC .......... G01V 3/24; G01V 3/38; E21B 47/002; E21B 49/00; E21B 47/12
See application file for complete search history.

(56) References Cited

U.S. PATENT DOCUMENTS 3,060,373 A 10/1962 Doll
3,132,298 A 5/1964 Doll et al.
(Continued)

FOREIGN PATENT DOCUMENTS

| CA | 685727 | 5/1964 |
| WO | 2008094256 | 8/2008 |
| WO | 2019177588 | 9/2019 |

OTHER PUBLICATIONS

Extended European Search Report for Application No. 17930679.0 dated Oct. 9, 2020.
(Continued)

*Primary Examiner* — Christopher P McAndrew
*Assistant Examiner* — Zannatul Ferdous
(74) *Attorney, Agent, or Firm* — John Wustenberg; C. Tumey Law Group PLLC

(57) ABSTRACT

A variety of methods and systems are disclosed, including, a method for improving resistivity imaging, comprising: disposing a downhole tool into a borehole, wherein the downhole tool comprises a pad and a button array disposed on the pad; taking a measurement with the button array at a location in the borehole; selecting a projection angle; obtaining a corrected measurement from the projection angle and the measurement; and constructing an image using the corrected measurement. A system for improving resistivity imaging, comprising: a downhole tool, wherein the downhole tool comprises: an arm, and a pad; a conveyance; and an information handling system, wherein the information handling system is configured to take a measurement with the button array at a location in the borehole; select a projection angle; obtain a corrected measurement from the projection angle and the measurement; and construct an image using the corrected measurement.

23 Claims, 5 Drawing Sheets

(51) Int. Cl.
*E21B 49/00* (2006.01)
*E21B 47/00* (2012.01)
*E21B 47/002* (2012.01)
*E21B 47/12* (2012.01)

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 6,191,588 | B1 | 2/2001 | Chen |
| RE42,493 | E | 6/2011 | Tabarovsky et al. |
| 8,579,037 | B2 | 11/2013 | Jacob |
| 8,901,932 | B2 * | 12/2014 | Hayman ............ G01V 3/24 324/355 |
| 8,901,933 | B2 | 12/2014 | Hayman |
| 2008/0290873 | A1 * | 11/2008 | Homan ............ G01V 3/30 324/337 |
| 2009/0302854 | A1 * | 12/2009 | Forgang ............ G01V 3/24 324/355 |
| 2010/0295548 | A1 | 11/2010 | Georgi et al. |
| 2013/0105224 | A1 | 5/2013 | Donderici et al. |
| 2015/0153474 | A1 | 6/2015 | Donderici et al. |
| 2015/0185354 | A1 | 7/2015 | Hayman |
| 2015/0355372 | A1 * | 12/2015 | Bloemenkamp ....... G01V 13/00 702/7 |
| 2016/0274263 | A1 | 9/2016 | Hou et al. |
| 2017/0075002 | A1 | 3/2017 | Cheung et al. |

OTHER PUBLICATIONS

ISRWO International Search Report and Written Opinion for PCT/US2017/101588 dated Jul. 26, 2018.
SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.

* cited by examiner

PROCESSING RESISTIVITY IMAGES IN WELLS WITH OIL BASED MUDS

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These tools may provide a resistivity image of the formation immediately surrounding the borehole. In essence, their function is the electrical equivalent of the formation coring, with much higher borehole coverage. Borehole imagers may be used to determine formation stratigraphy, dips of the formation layers, as well as borehole and formation stress. Borehole imagers may be particularly important in learning about thin beds and fracture locations. Oil based muds may provide higher performance than the water based muds and may be preferable in deep water environments where high temperature and pressure cause loss of water and in shale zones where water may cause swelling. However, oil based muds may be highly resistive. At low frequencies, this resistance may reduce the sensitivity of the borehole imager tools to the outside formation. To overcome this effect, the borehole imager tools may operate at high frequencies. At these high frequencies, the pads may become capacitively coupled to the formation, reducing the effect of the oil based mud. However, there is an upper limit to the frequencies that may be used, since at very high frequencies the dielectric effect in formations becomes dominant. As a result, the borehole imager tools may operate at multiple frequencies. A final response may be obtained by combining the results where each frequency is most accurate. Although capacitive coupling may reduce the effect of the highly resistive mud, the effect may still be a significant component of the measured impedance. The effect may be larger in low formation resistivities and higher standoffs between the borehole wall and the button arrays of the borehole imager tool (as well as lower frequencies as stated above.) Currently, a projection of the measured impedance in a direction orthogonal to the mud impedance may be used to alleviate this issue. This projection may have been determined from the phase angle difference between the mud and measured formation impedances. However, the current method does not offer the flexibility to adjust the projection based on known or measured formation and mud properties to provide optimal cancellation of the mud effect. It also does not offer a capability to adjust the projection, such that other undesirable artifacts such as the tool body effect are removed.

BRIEF DESCRIPTION OF THE DRAWINGS

For a detailed description of the preferred embodiments of the invention, reference will now be made to the accompanying drawings in which.

DETAILED DESCRIPTION

The present disclosure relates generally to a system and method for improving resistivity images in wells with oil based muds. More particularly, a system and method for using a processing technique where the mud impedance is not assumed to be orthogonal to the total impedance. This may allow for greater flexibility and potential improvements in results. The method may be used to correct for the tool body effect, as well as, the borehole mud effect. The tool body effect may be caused by the currents returning through the mandrel rather than the intended return electrode. The tool body effect may cause nonlinearity in tool response to the resistivity of the resistivity of the formation. Oil based muds may be highly resistive and may reduce the sensitivity of the tool to the formation. This phenomenon may also be referred to as the borehole mud effect. The borehole mud effect may occur due to the high resistivity of oil based mud. The resistance produced by the oil based mud may reduce the sensitivity of the tool to the formation. A method to determine an optimal projection angle is also disclosed herein.

Figure 1:
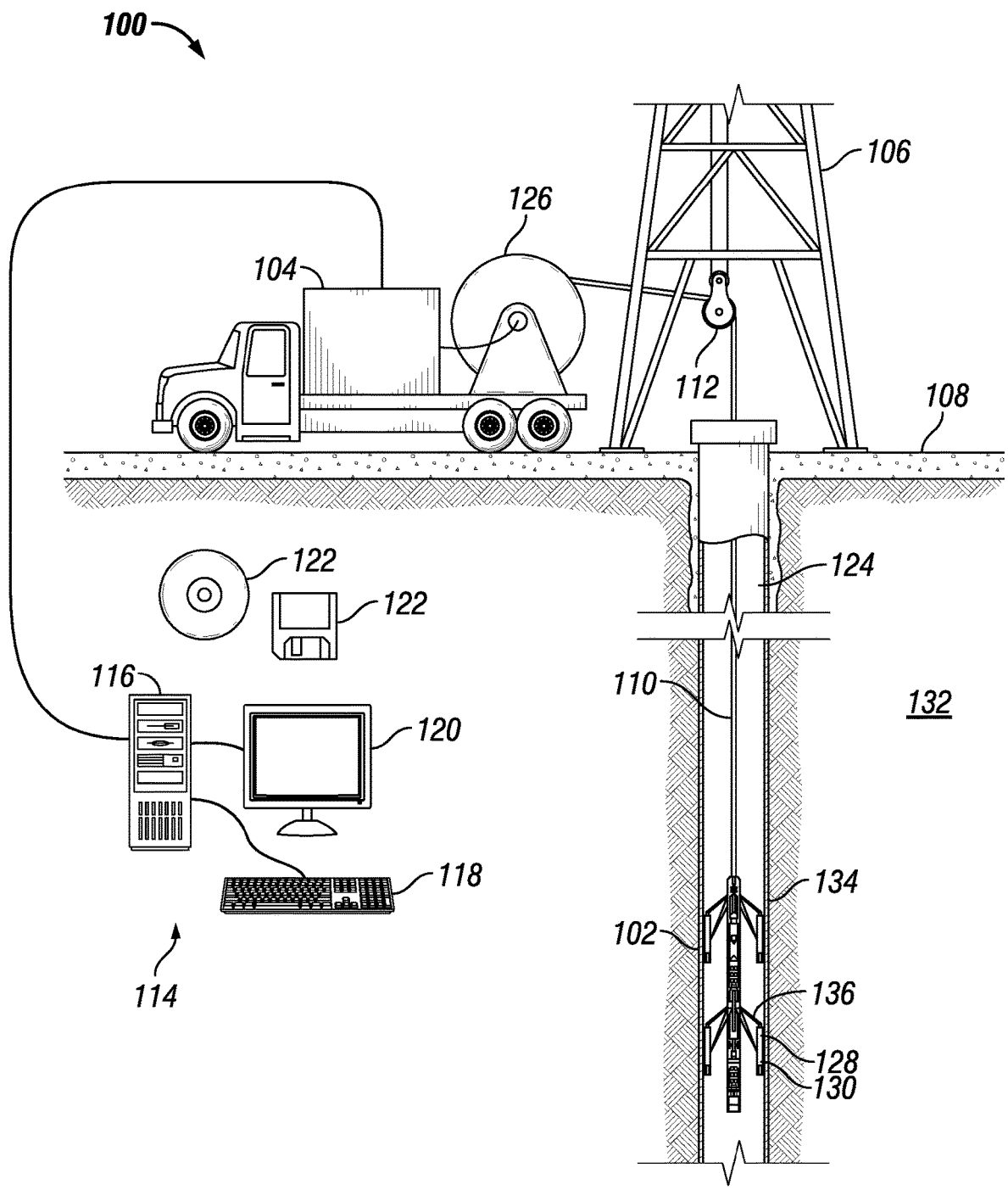
FIG. 1 illustrate an example of a well measurement system.

FIG. 1 illustrates a cross-sectional view of a well measurement system 100. As illustrated, well measurement system 100 may comprise downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some examples, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may be utilized by information handling system 114 to determine and display a high-resolution resistivity image of formation 132 immediately surrounding borehole 124. These images may be used in reservoir characterization. High resolution of the images may allow accurate identification of thin beds and other fine features such as fractures, clasts and vugs. These images may give information about the sedimentology, lithology, porosity and permeability of the formation 132. The images may complement, or in some cases replace, the process of coring.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a button array 128 and/or a return electrode 130. Button array 128 and/or return electrode 130 may be disposed on at least one pad 134 in any suitable order. For example, a pad 134 may include only button arrays 128 and/or return electrodes 130. Further, a pad 134 may comprise both button array 128 and return electrodes 130. Pads 134 may be attached to at least one arm 136 that may extend from downhole tool 102. Arm 136 may extend pad 134 away from downhole tool 102. In examples, arm 136 may place pad 134 in contact with borehole 124. It should be noted that there may be a plurality of arms 136. One or more arms 136 may place an arrangement of button arrays 128 and/or return electrodes 130 in close proximity to the wall of borehole 124.

In examples, downhole tool 102 may operate with additional equipment (not illustrated) on surface 108 and/or disposed in a separate well measurement system (not illustrated) to record measurements and/or values from formation 132.

The recorded signal may be transferred to information handling system 114 for further processing. In examples, there may be any suitable number of button arrays 128 and/or return electrodes 130, which may be controlled by information handling system 114. Information and/or measurements may be processed further by information handling system 114 to determine properties of borehole 124, fluids, and/or formation 132. It should be noted that information handling system 114 may be configured to take a measurement and or a plurality of measurements with button array 128 or a plurality of button arrays 128 at a location or a plurality of locations in borehole 124. These locations may be referred to as a first location in the borehole, a second location in the borehole, a third location in the borehole, a fourth location in the borehole and so on. These locations may also be described as an interval or intervals of the borehole. In a non-limiting example these intervals may be described as, a first interval of the borehole, a second interval of the borehole, a third interval of the borehole, a fourth interval of the borehole and so on. It should be noted that these intervals may be different intervals of a given borehole. Information handling system 114 may also be configured to select a projection angle (disclosed below) that may reduce the borehole mud effect. Information handling system 114 may also be configured to obtain a corrected measurement ($Z_\alpha$) using the projection angle (discussed below) and the measurement. Information handling system 114 may also be configured to construct an image based on the corrected measurement. The image may be a resistivity image of the formation 132 surrounding borehole 124. Information handling system 114 may be configured to display the image for an operator. These images may provide detailed characterization of reservoirs. In a non-limiting example, these images may be used to determine formation stratigraphy, dips of the formation layers as well as borehole and formation stress.

Figure 2:
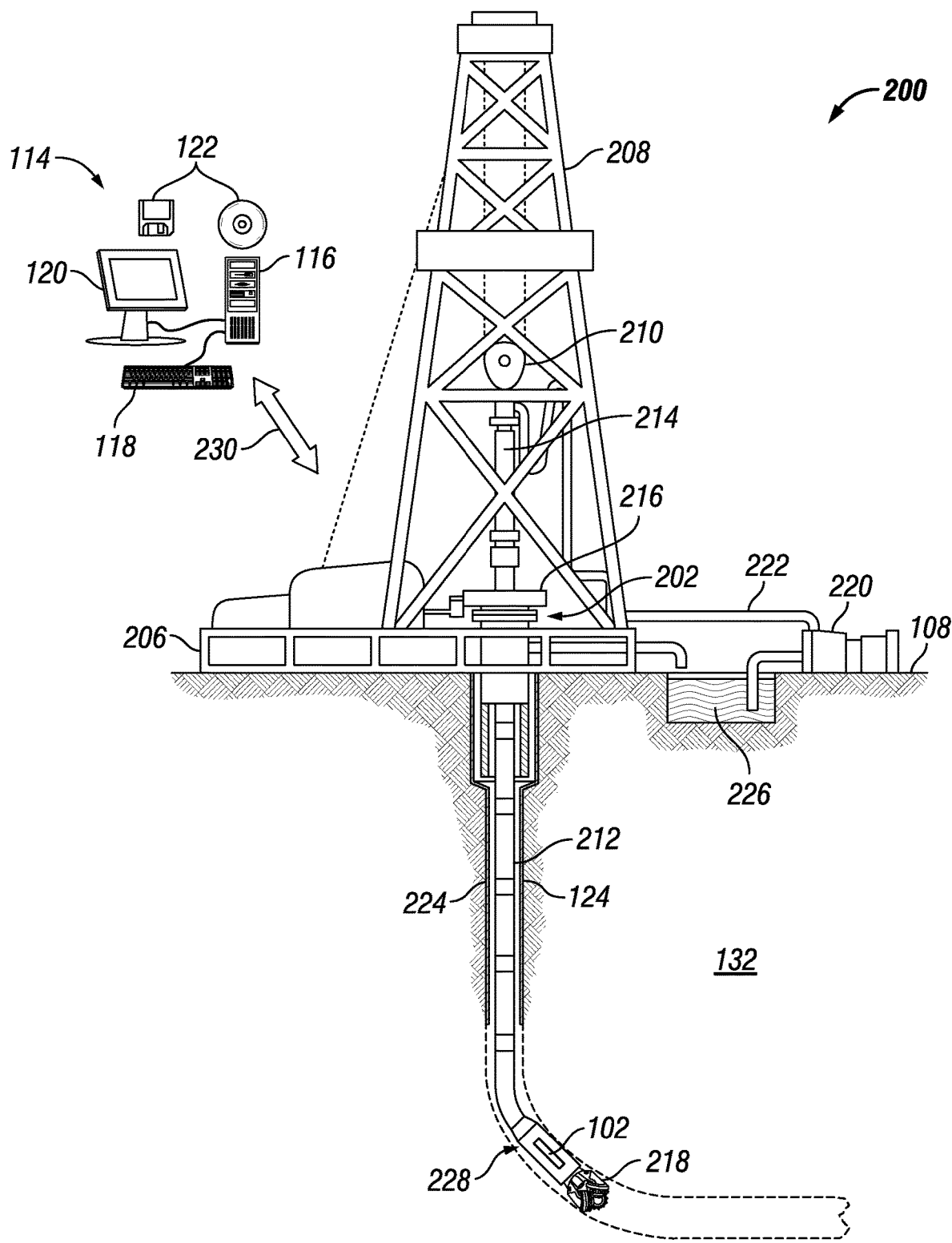
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into formation 132 from surface 108 (Referring to FIG. 1). Generally, borehole 124 may include horizontal, vertical, slanted, curved, and other types of borehole geometries and orientations. Imaging tools are primarily used in uncased sections of the borehole; however, measurements in cased sections may be made for purposes such as the calibration of the tool.

As illustrated, borehole 124 may extend through formation 132. As illustrated in FIG. 2, borehole 124 may extend generally vertically into the formation 132, however borehole 124 may extend at an angle through formation 132, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. Downhole tool 102 may comprise test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (Referring to FIG. 1), which may be disposed on surface 108. Without limitation, information handling system 114 may be disposed downhole in bottom hole assembly 228. Processing of information recorded may occur downhole and/or on surface 108. Processing occurring downhole may be transmitted to surface 108 to be recorded, observed, and/or further analyzed. Additionally, information recorded on information handling system 114 that may be disposed downhole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3:
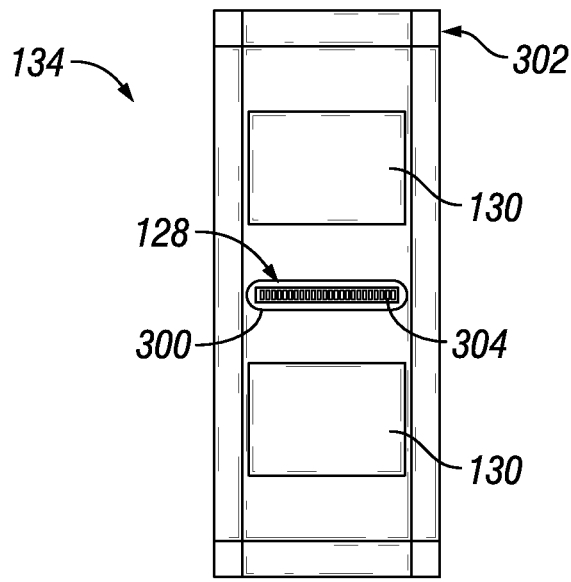
FIG. 3 illustrates an example of a pad.

FIG. 3 illustrates an example of pad 134. Pad 134 may serve to place button array 128 and/or return electrode 130 in contact with or close proximity to the borehole 124. Pad 134 may comprise a button array 128, a return electrode 130, a guard 300, and a housing 302. In examples, there may be a plurality of button arrays 128. There may be any suitable number of button electrodes 304 within button array 128 that may produce a desired, predetermined current. A button electrode 304 may be an electrode for sensing impedance in the pad 134 and or downhole tool 102 (Referring to FIG. 1). There may be a plurality of button electrodes 304 which may make up button array 128. Without limitation, the range for a suitable number of button electrodes 304 within button array 128 may be from about one button electrode 304 to about one hundred button electrodes 304. For example, the range for a suitable number of button electrodes 304 within button array may be from about one button electrode 304 to about twenty-five button electrodes 304, from about twenty-five button electrodes 304 to about fifty button electrodes 304, from about fifty button electrodes 304 to about seventy-five button electrodes 304, or from about seventy-five button electrodes 304 to about one hundred button electrodes 304. It should be noted, that a plurality of projection angles 510

(referring to FIG. 5) may be used for a plurality of pads 134. Also, a plurality of projection angles 510 (referring to FIG. 5) may be used for a plurality of button arrays 128. Wherein the plurality of projection angles 510 (referring to FIG. 5) may be different, the plurality of pads 134 may be different, and the plurality of button arrays 128 may be different.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each button electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each button electrode 304 may be inversely proportional to the impedance seen by that button electrode 304. This impedance may be affected by the properties of formation 132 and the mud directly in front of each button electrodes 304. Therefore, current emitted by each button electrode 304 may be measured and recorded in order to obtain an image of the resistivity of formation 132. It should be noted, that this process may take a plurality of measurements at different locations in the borehole 124 (referring to FIG. 1). For example, measurements may be taken at a first location in the borehole 124 (referring to FIG. 1), a second location in the borehole 124 (referring to FIG. 1), a third location in the borehole 124 (referring to FIG. 1), a fourth location in the borehole 124 (referring to FIG. 1) and so on. These locations may also be described as an interval of the borehole 124 (referring to FIG. 1). In a non-limiting example these intervals may be described as, a first interval of borehole 124 (referring to FIG. 1), a second interval of borehole 124 (referring to FIG. 1), a third interval of borehole 124 (referring to FIG. 1), a fourth interval of borehole 124 (referring to FIG. 1) and so on. It should be noted that these intervals may be different intervals of borehole 124 (referring to FIG. 1). An image may be constructed using corrected measurements from a single location or a plurality of locations within borehole 124 (referring to FIG. 1). Drilling, logging, completion, and or production parameters may then be adjusted based on the constructed image.

In examples, a current may be transmitted from a button electrode 304 and return to return electrode 130. These two electrodes may be referred to as the current electrodes. Then, the voltage drop across a set of button electrodes 304 (i.e. button array 128) may be measured and used to estimate the impedance of formation 132. In these alternative implementations, button electrodes 304 may be referred to as voltage electrodes or monitor electrodes. Proposed method may operate in any of the two designs above or any other similar oil based mud resistivity imager tool without any limitations. In the rest of the text, the imager tool will be assumed to be of the first design without any loss of generality.

Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing 302 may be made with any suitable material. Without limitation, suitable material may be metals, nonmetals, plastics, ceramics, composites and/or combinations thereof. In examples, housing 302 may be a metal plate. Housing 302 may be connected through arm 136 to downhole tool 102 (referring to FIG. 1). An insulating material may be used to fill the remaining portions of pad 134. In examples, ceramics may be used as the insulating material to fill the remaining portions of pad 134.

Figure 4:
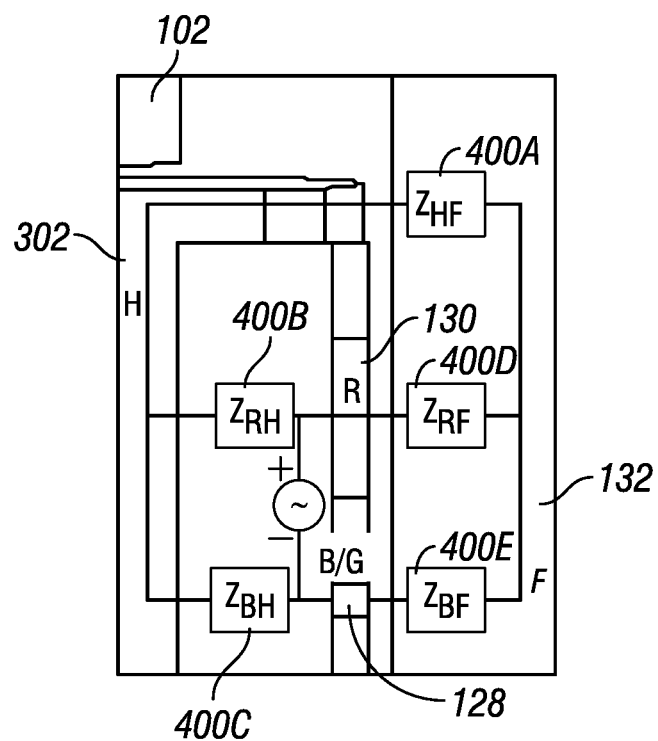
FIG. 4 illustrates is an example of a simple circuit model for a downhole tool.

An impedance value may be calculated through the current transmitting between a button electrode and formation 132 (referring to FIG. 1) for each button electrode 304. The voltage between button array 128 and return electrodes 130 may be measured and divided by the transmitted current to produce a value for the impedance seen by each button electrode 304. Most of the transmitted current may be returned to return electrodes 130 although, some portions of it may return through housing 302 and downhole tool 102 (referring to FIG. 1). FIG. 4 illustrates an example of a circuit model that approximates the downhole tool 102 (referring to FIG. 1). Different impedance effects may be approximately characterized by a housing-to-formation impedance value 400a, a return electrode-to-housing impedance value 400b, a return electrode-to-formation impedance value 400c, a button array-to-housing impedance value 400d, and a button array-to-formation impedance value 400e. Impedance may be calculated below, wherein Z is the impedance, $V_{BR}$ is the button array to return electrode voltage, and $I_B$ is the button array current:

$$Z = \frac{V_{BR}}{I_B} \quad (1)$$

The impedance calculated in Equation 1 may be approximately equal to $Z_{BF}+Z_{RF}$ wherein $Z_{BF}$ is impedance value 400c, measured from button array 128 to housing 302, and $Z_{RF}$ is impedance value 400d, measured from return electrode 130 to formation 132, as shown in FIG. 4. Impedance value 400c and impedance value 400d may have contributions from both the surrounding mud and formation 132. As such, equivalently it may be written in below as:

$$Z \approx Z_{BF} = Z_{mud} + Z_F \quad (2)$$

Furthermore, the measured impedance value may have contributions from both the surrounding mud and the formation 132. Assuming imaginary parts of the impedance value of the mud ($Z_{mud}$), and the formation 132 impedance value ($Z_F$) may be mainly capacitive, and assuming this capacitance may be in parallel with the resistive portions, $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \quad (3)$$

wherein $R_M$ is the mud resistance, $R_F$ is the resistance of formation 132, $C_M$ is the mud capacitance, CF is the capacitance of formation 132, j is the unit imaginary number, and ω is the angular frequency. Both the mud resistance and mud capacitance may increase as standoff increases and may decrease with the increase in the effective area of button array 128.

Figure 5:
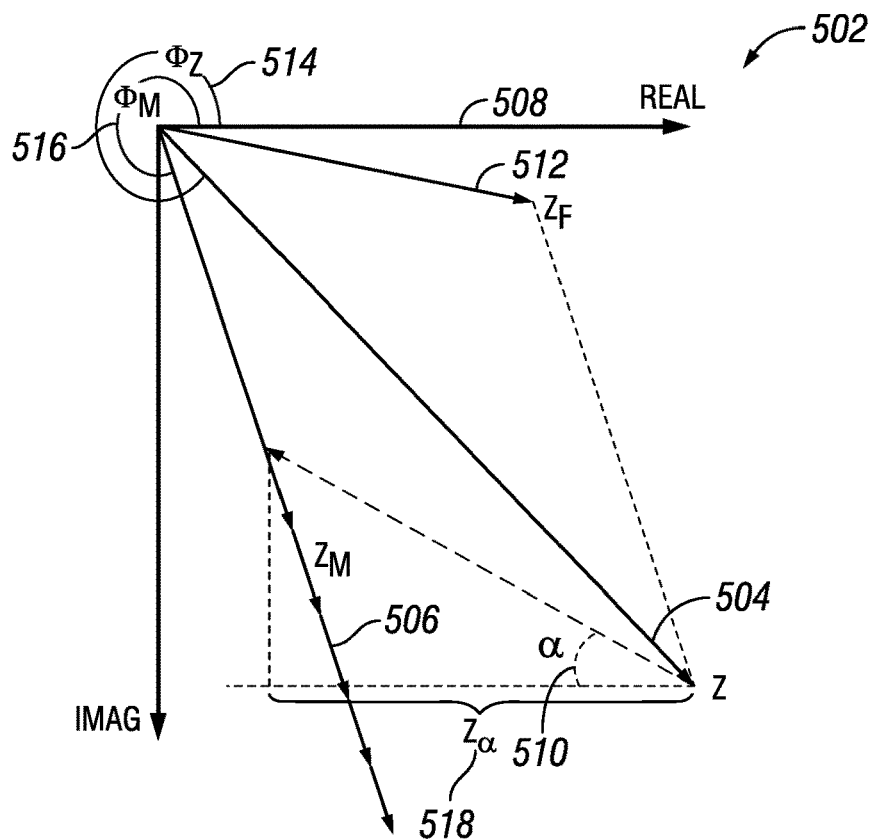
FIG. 5 illustrates is an example of a vector projection of $Z_\alpha$ processing in a complex plane.

FIG. 5 is an example of a vector projection of $Z_\alpha$ processing in a complex plane 502. The corrected measurement ($Z_\alpha$) 518 may be the projection of the vector starting from the measured impedance (Z) 504, and ends on a vector parallel to the mud impedance ($Z_{mud}$) 506, on the real axis 508. The projection angle 510, also referred to as α, may be the angle between the vector that has its origin at the measured impedance 504 and ends on a vector that is parallel to the mud impedance 506 and the real axis 508. Any suitable angle may be used for the projection angle. A suitable angle may include, but is not limited to about 0 degrees to about 60 degrees, or about 60 degrees to about 120 degrees, or about 120 degrees to about 180 degrees. The formation impedance ($Z_F$) 512 may also be shown in vector form in the complex plane. A phase angle of the measurement ($\Phi_Z$) 514 may be measured from the real axis 508 to the measured impedance 504. Any suitable phase angle of the measurement 514 may be used. In a non-limiting example, a suitable phase angle of the measurement may be from about 0° to about 360°, or 0° to about 90°, or about 90° to about 180°, or about 180° to about 270°, or about 270° to about 360°, or any combination thereof. Any suitable phase angle of the mud 516 may be used. In a non-limiting example, a suitable phase angle of the mud may be from about 0° to about 360°, or 0° to about 90°, or about 90° to about 180°, or about 180° to about 270°, or about 270° to about 360°, or any combination thereof. A phase angle of the mud ($\Phi_M$) 516 may be measured from the real axis 508 to a vector parallel to the mud impedance 506. $Z_\alpha$ processing may also be written in equation form:

$$Z_\alpha = |Z|\cos(\phi_Z)\frac{\tan(\phi_M) - \tan(\phi_Z)}{\tan(\phi_M) - \tan(\alpha)} \qquad (4)$$

It should be noted that any number of mathematical expressions may be equivalent to the form of Equation 4 and is not limited to the form disclosed herein. Equation 4 is a non-limiting example for the implementation of $Z_\alpha$ processing. A ratio of the function of the phase angle of the mud 516 and a phase angle of the measurement 514 to a function of the phase angle of the mud 516 and the projection angle 510 may be used to calculate the corrected measurement 518.

Figure 6:
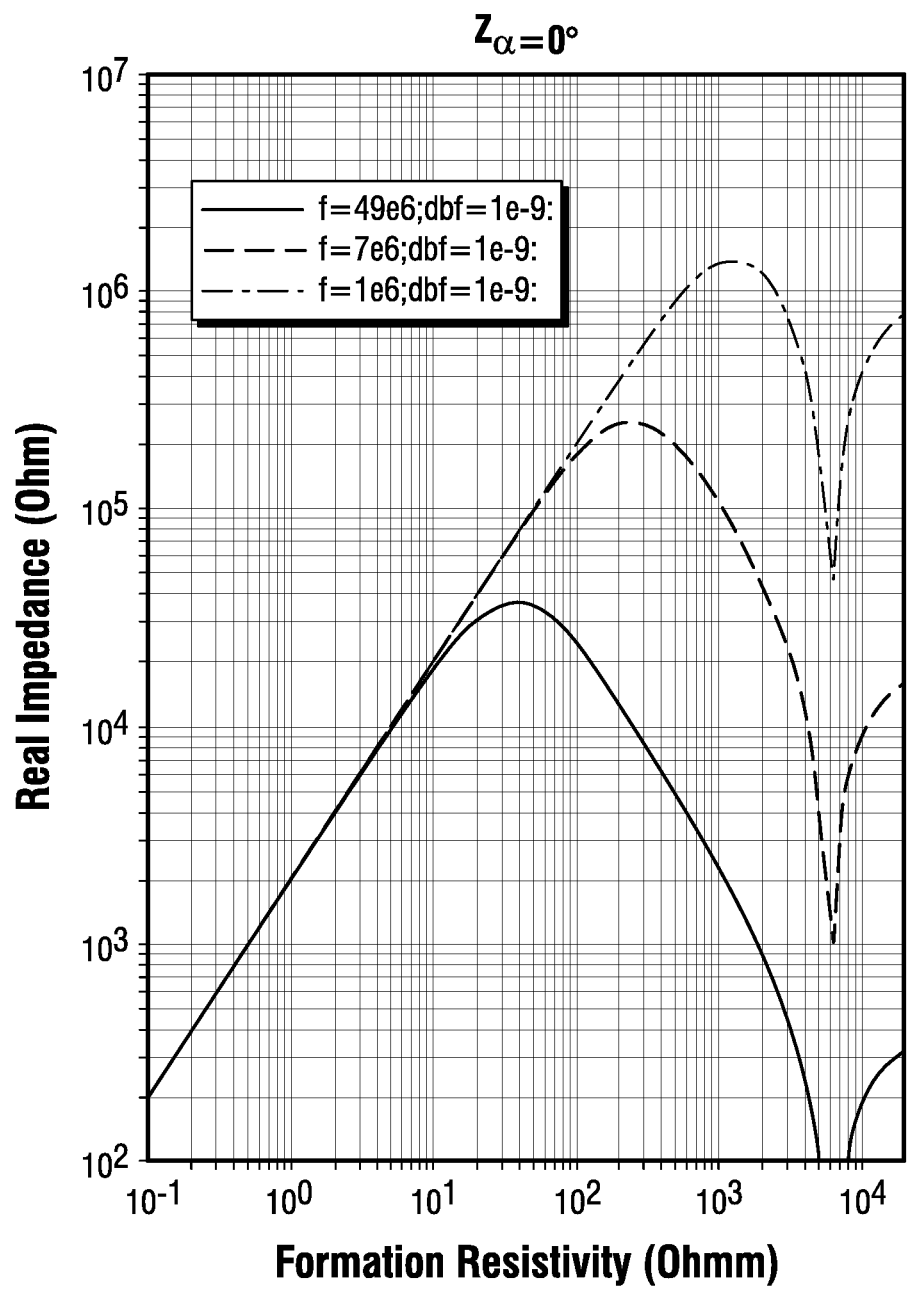
FIG. 6 illustrates an example of the real part of the measured impedance versus the formation resistivity for $Z_\alpha$ processing when the projection angle is 0°.

FIG. 6 illustrates an example of the real part of the measured impedance versus the formation resistivity for $Z_\alpha$ processing when the projection angle 510 is 0°. This plot may be created for a wide variety of projection angles 510. It should be noted that the projection angle 510 (referring to FIG. 5) may be chosen to reduce the borehole mud effect and or any other undesirable artifacts. An undesirable artifact may be anything that may cause a nonlinear tool response using the $Z_\alpha$ processing. In a nonlimiting example, an undesirable artifact may be the tool body effect. Another example of an undesirable artifact may include, but is not limited to, parasitic noise from other tools in the borehole assembly.

In some cases, the projection angle 510 may be orthogonal to an angle of the tool body effect. In some cases, projection angle 510 may be chosen based on a plurality of measured or expected formation and mud resistivity values for a given interval of the borehole. In this non-limiting example, an arbitrary value for the projection angle 510 was chosen. In FIG. 6, the following parameters were selected, the formation permittivity, $\varepsilon_F$, is 15, the mud permittivity, $\varepsilon_M$, is 6 and mud resistivity, $\rho_M$, is 8000 Ohm-meters. The plot shows results for three different frequencies, 1 megahertz, 7 megahertz and 49 megahertz, at four different standoff distances 10' millimeters, 1 millimeter, 2 millimeters, and 3 millimeters. It should be noted that any suitable frequency may be used. Standoff distances may be characterized as the distance of the button array 128 to the formation 132 (referring to FIG. 4). A suitable frequency may include about 100 kHz to about 1 MHz, or about 1 MHz to about 100 MHz. It should be noted, that a plurality of projection angles may be used for different frequencies. Also, any suitable standoff distance may be used. A suitable standoff distance may include, but is not limited to, about 0.5 mm to about 2 mm, or about 2 mm to about 4 mm, or about 4 mm to about 7 mm. In addition, any suitable formation permittivity may be used. A suitable formation permittivity may include, but is not limited to, about 1 to about 10, or about 10 to about 80. Any suitable mud permittivity may be used. Suitable mud permittivity may include from about 2 to about 6, or about 6 to about 15. Any suitable mud resistivity may be used. A suitable mud resistivity may include, but is not limited to, from about 500 Ohm-m to about 100000 Ohm-m. A suitable mud resistivity may be frequency dependent. It should be noted, the imaginary part of the impedance may be determined by the mud capacitance and is therefore not plotted. The plot shows that the standoff effect is almost completely eliminated. It should also be noted, that these parameters may be adjusted to accommodate different borehole conditions. Based on known information, the projection angle 510 may be optimized so that the contribution of the mud impedance 506, also known as the borehole mud effect, is reduced. It should be noted that the projection angle 510 may be chosen to reduce other undesirable artifacts. Projection angle 510 may also be chosen based on previous measurements obtained by the downhole tool 102. The optimized projection angle 510 may be equal to the angle between the formation impedance 512 and the real axis 508 of the complex plane (referring to FIG. 5). In an example, a phase angle of the mud 516 may be calculated at the surface using known properties. In another example, the phase angle of the mud 516 may be calculated at a certain depth within the borehole by making a closed measurement. Once the phase angle of the mud 516 is calculated, based on the temperature of the mud and the depth range of the zone of interest, and optimal phase angle of the mud may be calculated using known techniques to estimate variation of mud impedance 506 with pressure and temperature. The log may then be processed using this optimal mud angle.

In addition, a value for the formation impedance 512 or mud impedance 506 may be approximated using information from other tools or prior knowledge. For example, the mud impedance 506 may be estimated using mud cell and caliper measurements. Another example may include, estimating the mud impedance 506 based on depth and temperature information at each location in which measurements are performed, as mentioned above. It should be noted that each measurement location may be referred to as a logging point. Formation impedance 512 may be estimated based on shallow resistivity measurements obtained from other tools. An extrapolation scheme may be used to account for the difference in frequencies in this estimation.

Furthermore, a simple real-time inversion algorithm may be developed to obtain an estimate of mud impedance 506. All of this information may be gathered and used to determine an optimal projection angle for a logging point or for an interval of logging points to improve the accuracy of the $Z_\alpha$ processing.

In example, the effect from downhole tool 102 may be eliminated using the $Z_\alpha$ processing described above. The effect of downhole tool 102 may be caused by the currents returning through the downhole tool 102 rather than return electrode 130. This effect may cause non-linearity in tool response to the resistivity of formation 132 (referring to FIG. 1). This is particularly prevalent when the formation resistivities are low. The effect of downhole tool 102, as well as, the borehole mud effect may be reduced by using a specific projection angle. Furthermore, other undesirable artifacts may also be reduced.

Figure 7:
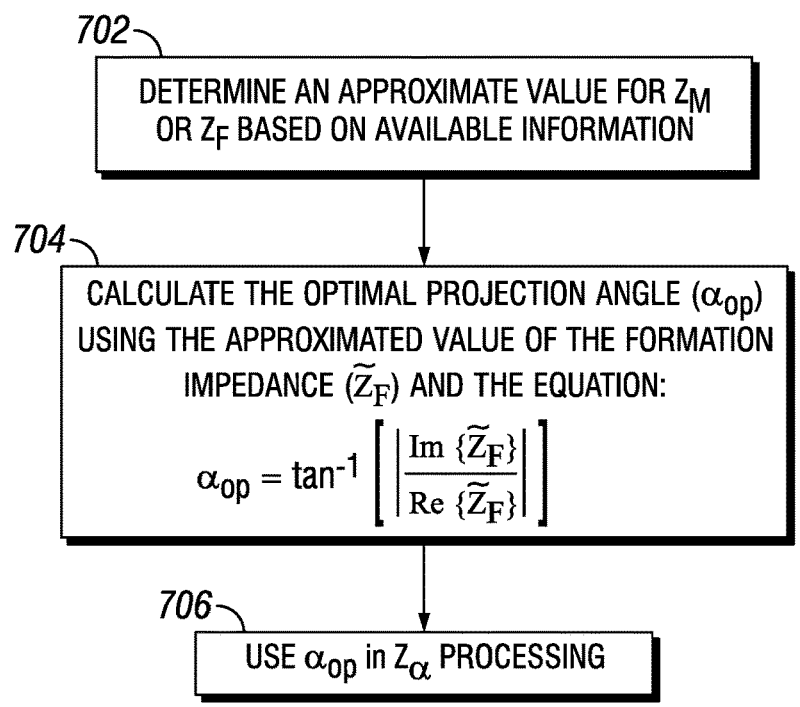
FIG. 7 illustrates an example of the methodology used to determine an optimal value for the projection angle.

FIG. 7 is an example of the methodology used to determine an optimal value for the projection angle 510. In the first step 702, either the mud impedance 506 or formation impedance 512 or both are estimated using the available information. The formation impedance 512 may be estimated using the following equation:

$$\tilde{Z}_F \approx Z - \tilde{Z}_{MF} \quad (5)$$

Wherein the formation impedance 512 is approximately equal to the measured impedance 504 minus the mud impedance 506. In the second step 704, an optimal projection angle is determined using the approximated value of the formation impedance 512. The optimal projection angle may be calculated using the following equation:

$$\alpha_{op} = \tan^{-1}\left[\left|\frac{\mathrm{Im}\{\tilde{Z}_F\}}{\mathrm{Re}\{\tilde{Z}_F\}}\right|\right] \quad (6)$$

Wherein $\alpha_{op}$ is the optimal projection angle, $\mathrm{Im}\{\tilde{Z}_F\}$ is the imaginary part of the approximated value of the formation impedance, and $\mathrm{Re}\{\tilde{Z}_F\}$ is the real part of the approximated value of the formation impedance. Finally, in the last step 706, the optimal projection angle is used in the $Z_\alpha$ processing at a single depth or over an interval as mentioned above.

Statement 1. A method for improving resistivity imaging, comprising: disposing a downhole tool into a borehole, wherein the downhole tool comprises a pad and a button array disposed on the pad; taking a measurement with the button array at a location in the borehole; selecting a projection angle; obtaining a corrected measurement from the projection angle and the measurement; and constructing an image using the corrected measurement.

Statement 2. A method of statement 1, wherein the projection angle is approximately 0°.

Statement 3. A method of statements 1 or 2, wherein the projection angle is chosen based, at least partially, on a previous measurement obtained earlier by the downhole tool.

Statement 4. The method of statement 3, wherein the previous measurement is from measurements taken by the downhole tool at a second location in the borehole.

Statement 5. The method of any one of statements 1 to 4, wherein the projection angle is chosen based, at least partially, on a plurality of measured formation and mud resistivity values for a given interval of the borehole.

Statement 6. The method of statement 5, wherein the projection angle reduces borehole mud effect and or any other undesirable artifacts for a given range of formation resistivity and mud resistivity values.

Statement 7. The method of any one of statements 1 to 6, wherein a ratio of a function of a phase angle of mud to a function of the projection angle is used to calculate a corrected measured angle.

Statement 8. The method of statement 7, wherein a ratio of the function of the phase angle of mud and a phase angle of the measurement to a function of the phase angle of the mud and the projection angle is used to calculate the corrected measurement.

Statement 9. The method of statement 8, wherein the ratio is calculated using $$Z_\alpha = |Z|\cos(\phi_Z)\frac{\tan(\phi_M) - \tan(\phi_Z)}{\tan(\phi_M) - \tan(\alpha)},$$

wherein Z is measured impedance, wherein $\Phi_M$ is the phase angle of mud, wherein $\Phi_Z$ is the phase angle of the measurement, wherein $\alpha$ is the projection angle.

Statement 10. The method of any one of statements 1 to 9, wherein a plurality of projection angles are used for different frequencies.

Statement 11. The method of any one of statements 1 to 10, wherein a plurality of projection angles are used for a plurality of pads.

Statement 12. The method of any one of statements 1 to 11, wherein a plurality of projection angles are used for a plurality of button arrays.

Statement 13. The method of any one of statements 1 to 12, wherein the projection angle is chosen to reduce a tool body effect.

Statement 14. The method of statement 13, wherein the projection angle is orthogonal to an angle of the tool body effect.

Statement 15. A system for improving resistivity imaging, comprising: a downhole tool, wherein the downhole tool comprises: an arm; and a pad, wherein the pad comprises a button array and at least one return electrode; a conveyance for disposing the downhole tool in a borehole; and an information handling system, wherein the information handling system is configured to take a measurement with the button array at a location in the borehole; select a projection angle; obtain a corrected measurement from the projection angle and the measurement; and construct an image using the corrected measurement.

Statement 16. The system for improving resistivity imaging of statement 15, further comprising adjusting logging parameters based on the image.

Statement 17. The system for improving resistivity imaging of statements 15 or 16, further comprising adjusting completion operations based on the image.

Statement 18. The system for improving resistivity imaging of any one of statements 15 to 17, further comprising adjusting production parameters based on the image.

Statement 19. The system for improving resistivity imaging of any one of statements 15 to 18, wherein the projection angle is chosen based, at least partially, on a previous measurement obtained earlier by the downhole tool.

Statement 20. The system for improving resistivity imaging of statement 19, wherein the previous measurement is from measurements taken by the downhole tool at a second location in the borehole.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

Although the present invention and its advantages have been described in detail, it should be understood that various changes, substitutions and alterations may be made herein without departing from the spirit and scope of the invention as defined by the appended claims.

What is claimed is:

1. A method for improving resistivity imaging, comprising:
    disposing a downhole tool into a borehole, wherein the downhole tool comprises a pad and a button array disposed on the pad;
    taking an impedance measurement with the button array at a location in the borehole;
    selecting a projection angle, wherein the projection angle is between a first vector and a reference vector wherein the first vector connects a measured impedance vector and a second vector that is parallel to a mud impedance and the reference vector is parallel to a real axis;
    obtaining a corrected measurement from the projection angle and the measurement; and
    constructing an image using the corrected measurement.

2. The method of claim 1, wherein the projection angle is approximately 0°.

3. The method of claim 1, wherein the projection angle is chosen based, at least partially, on a previous measurement obtained earlier by the downhole tool.

4. The method of claim 3, wherein the previous measurement is from measurements taken by the downhole tool at a second location in the borehole.

5. The method of claim 1, wherein the projection angle is chosen based, at least partially, on a plurality of measured formation and mud resistivity values for a given interval of the borehole.

6. The method of claim 5, wherein the projection angle reduces borehole mud effect and or any other undesirable artifacts for a given range of formation resistivity and mud resistivity values.

7. The method of claim 1, wherein a ratio of a function of a phase angle of mud to a function of the projection angle is used to calculate the corrected measurement.

8. The method of claim 7, wherein a ratio of the function of the phase angle of mud and a phase angle of the measurement to a function of the phase angle of the mud and the projection angle is used to calculate the corrected measurement.

9. The method of claim 8, wherein the ratio is calculated using $$Z_\alpha = |Z|\cos(\phi_Z)\frac{\tan(\phi_M) - \tan(\phi_Z)}{\tan(\phi_M) - \tan(\alpha)},$$

wherein Z is the measured impedance, wherein $\Phi_M$ is the phase angle of mud, wherein $\Phi_Z$ is the phase angle of the measurement, wherein α is the projection angle.

10. The method of claim 1, wherein a plurality of projection angles are used for different frequencies.

11. The method of claim 1, wherein a plurality of projection angles are used for a plurality of pads.

12. The method of claim 1, wherein a plurality of projection angles are used for a plurality of button arrays.

13. The method of claim 1, wherein the projection angle is chosen to reduce a tool body effect.

14. The method of claim 13, wherein the projection angle is orthogonal to an angle of the tool body effect.

15. A system for improving resistivity imaging, comprising:
    a downhole tool, wherein the downhole tool comprises:
        an arm; and
        a pad, wherein the pad comprises a button array and at least one return electrode;
    a conveyance for disposing the downhole tool in a borehole; and
    an information handling system, wherein the information handling system is configured to:
        take an impedance measurement with the button array at a location in the borehole;

select a projection angle, wherein the projection angle is between a first vector and a reference vector wherein the first vector connects a measured impedance vector and a second vector that is parallel to a mud impedance and the reference vector is parallel to a real axis;

obtain a corrected measurement from the projection angle and the measurement; and construct an image using the corrected measurement.

16. The system for improving resistivity imaging of claim 15, further comprising adjusting logging parameters based on the image.

17. The system for improving resistivity imaging of claim 15, further comprising adjusting completion operations based on the image.

18. The system for improving resistivity imaging of claim 15, further comprising adjusting production parameters based on the image.

19. The system for improving resistivity imaging of claim 15, wherein the projection angle is chosen based, at least partially, on a previous measurement obtained earlier by the downhole tool.

20. The system for improving resistivity imaging of claim 19, wherein the previous measurement is from measurements taken by the downhole tool at a second location in the borehole.

21. A method for improving resistivity imaging, comprising:

disposing a downhole tool into a borehole, wherein the downhole tool comprises a pad and a button array disposed on the pad;

taking a measurement with the button array at a location in the borehole;

selecting a projection angle, wherein a ratio of a function of a phase angle of mud to a function of the projection angle is used to calculate a corrected measurement;

obtaining the corrected measurement from the projection angle and the measurement; and constructing an image using the corrected measurement.

22. A method for improving resistivity imaging, comprising:

disposing a downhole tool into a borehole, wherein the downhole tool comprises a pad and a button array disposed on the pad;

taking a measurement with the button array at a location in the borehole;

selecting a projection angle, wherein a ratio of a function of a phase angle of mud to a function of the projection angle is used to calculate a corrected measurement;

obtaining the corrected measurement from the projection angle and the measurement, wherein a ratio of the function of the phase angle of mud and a phase angle of the measurement to a function of the phase angle of the mud and the projection angle is used to calculate the corrected measurement; and constructing an image using the corrected measurement.

23. A method for improving resistivity imaging, comprising:

disposing a downhole tool into a borehole, wherein the downhole tool comprises a pad and a button array disposed on the pad;

taking a measurement with the button array at a location in the borehole;

selecting a projection angle, wherein a ratio of a function of a phase angle of mud to a function of the projection angle is used to calculate a corrected measurement;

obtaining the corrected measurement from the projection angle and the measurement, wherein a ratio of the function of the phase angle of mud and a phase angle of the measurement to a function of the phase angle of the mud and the projection angle is used to calculate the corrected measurement and wherein the ratio is calculated using $$Z_\alpha = |Z|\cos(\phi_Z)\frac{\tan(\phi_M) - \tan(\phi_Z)}{\tan(\phi_M) - \tan(\alpha)},$$

wherein Z is the measured impedance, wherein $\Phi_M$ is the phase angle of mud, wherein $\Phi_Z$ is the phase angle of the measurement, wherein $\alpha$ is the projection angle; and constructing an image using the corrected measurement.

* * * * *

UNITED STATES PATENT AND TRADEMARK OFFICE
CERTIFICATE OF CORRECTION

PATENT NO. : 11,243,325 B2
APPLICATION NO. : 16/587515
DATED : February 8, 2022
INVENTOR(S) : Burkay Donderici and Baris Guner It is certified that error appears in the above-identified patent and that said Letters Patent is hereby corrected as shown below:

In the Specification

Column 10, Line 5 please remove "distances 10'" and replace with --distances $10^{-6}$--

Signed and Sealed this
Twenty-sixth Day of April, 2022

Katherine Kelly Vidal
*Director of the United States Patent and Trademark Office*